United States Patent [19]
Fujioka

[11] Patent Number: 6,087,806
[45] Date of Patent: Jul. 11, 2000

[54] ELECTRIC VEHICLE

[75] Inventor: Ichiro Fujioka, Matsudo, Japan

[73] Assignee: Shisutemu Sooken Co., Ltd., Tokyo, Japan

[21] Appl. No.: 09/336,458

[22] Filed: Jun. 18, 1999

[30] Foreign Application Priority Data

Jun. 22, 1998 [JP] Japan ................... 10-210168

[51] Int. Cl.$^7$ .................................. H01M 10/46
[52] U.S. Cl. .......................... 320/109; 320/120
[58] Field of Search ................... 320/104, 108, 320/109, 116, 119, 120; 180/65.1; 414/281, 282

[56] References Cited

U.S. PATENT DOCUMENTS

| | | | |
|---|---|---|---|
| 5,594,318 | 1/1997 | Nor et al. | 320/109 |
| 5,669,470 | 9/1997 | Ross | 320/109 X |
| 5,803,215 | 9/1998 | Henze et al. | 320/109 X |

*Primary Examiner*—Edward H. Tso
*Attorney, Agent, or Firm*—Fay, Sharpe, Fagan, Minnich & McKee, LLP

[57] ABSTRACT

There is disclosed an electric vehicle comprising: a power reception section for receiving electric power energy from a power supply section disposed along a road, the electric power supplied by a charger disposed at a predetermined place; a coupling mechanism for interconnecting electric vehicles and permitting transfer of electric power energy; and a control unit for controlling interconnection of said electric vehicles, wherein said power supply section simultaneously charges batteries of a plurality of electric vehicles to be interconnected via said power reception section of the first one of the electric vehicles when the first electric vehicle passes over said power supply section on the road surface, and then similarly performs, in turn, simultaneous charging of batteries of the second or any succeeding electric vehicles for the rest each time the second and any succeeding vehicle passes over said power supply section on the road surface.

7 Claims, 6 Drawing Sheets

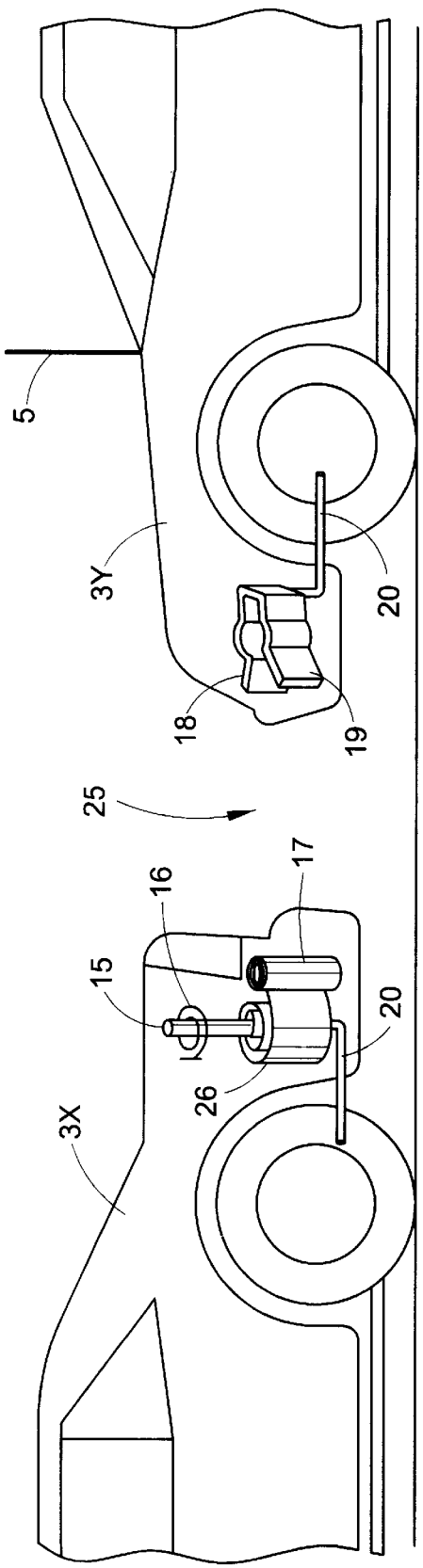
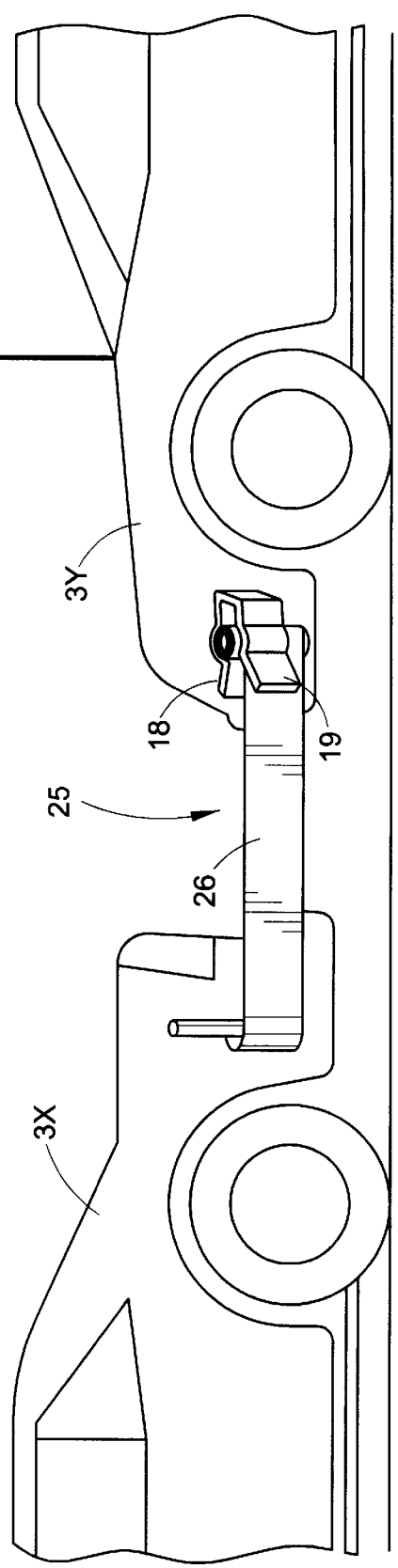
FIG.5A
FIG.5B

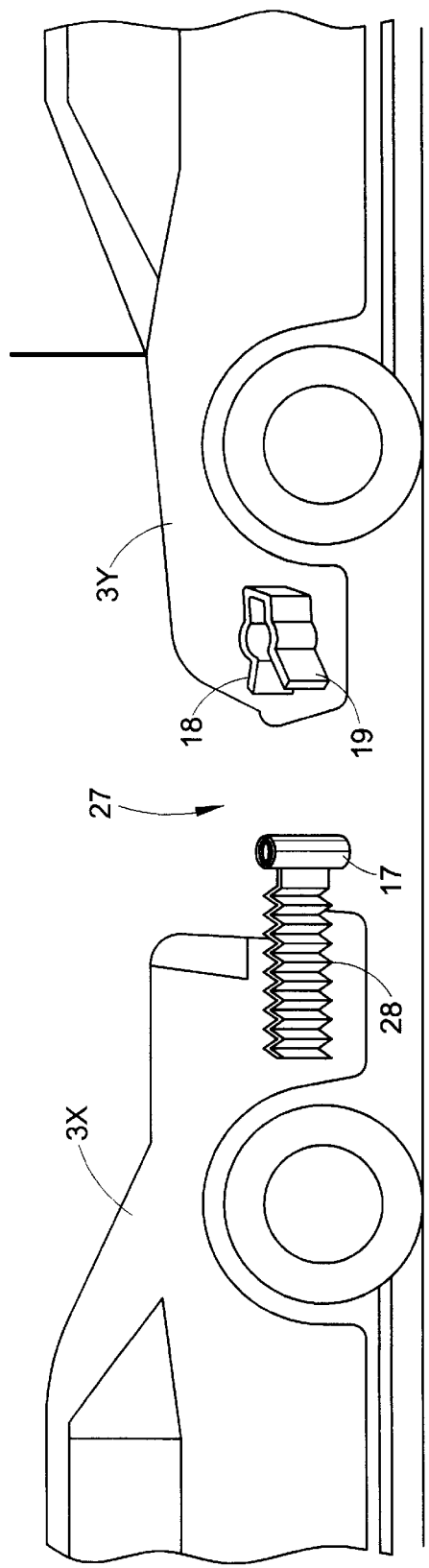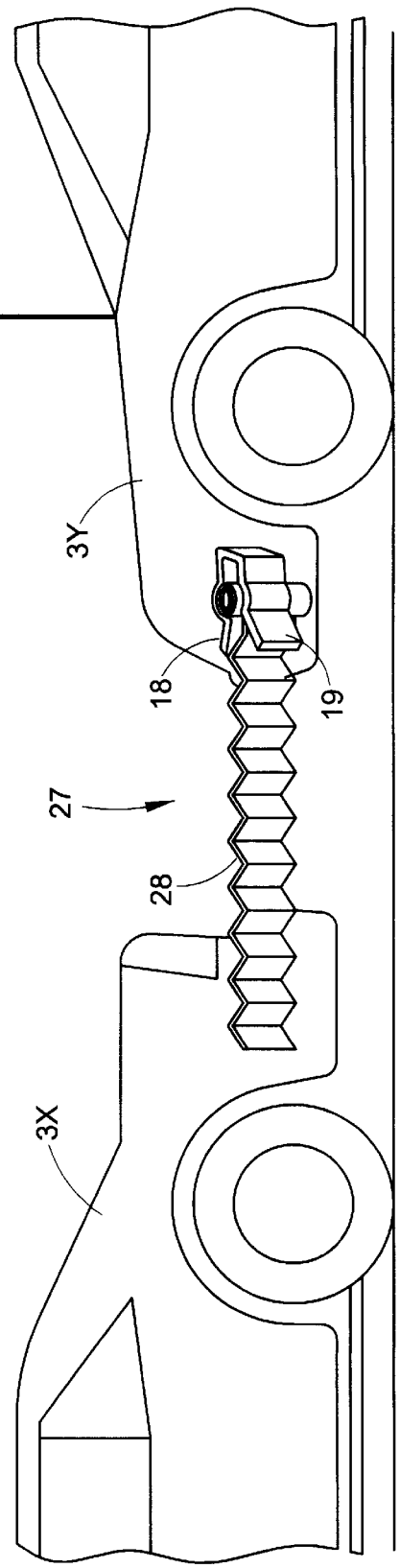

ELECTRIC VEHICLE

BACKGROUND OF THE INVENTION

1. Field of the Invention

The present invention relates to an electric vehicle and, more particularly, to the electric vehicle whose batteries can efficiently be charged during travel without requiring large-scale equipment.

2. Description of Prior Art

Environmental pollution due to hazardous substances in exhaust gasses still exist even now in spite of endeavor of many years on and improvement of vehicles of gasoline engines or diesel engines.

The common conceptions of electric vehicles driven by electrically powered motors are that they run slow. However, progress in modern technologies has accomplished a substantial increase in the speed of electric vehicles, steadily accelerating practical use the general public.

Because of the absence of an engine, electric vehicles emit no exhaust gasses containing hazardous substances, thus contributing significantly to environmental conservation.

More recently, vehicles have been marketed, such as so called "hybrid cars", which feature a combination of a gasoline engine and an electric motor. Unfortunately, such vehicles still emit gasses containing hazardous substances and, furthermore suffer from complicated configurations and quite high costs resulting from a drive mechanism involving the gasoline engine and the electric motor.

As mentioned above, thanks to technological progress, current electric vehicles are capable of running at fairly high speeds without hazardous exhaust gas emissions, thus contributing significantly to environmental conservation. Unfortunately, however, such "creen" electric vehicles suffer from the following problems.

The electric vehicle is adapted to electrically charge its battery through a converter for converting AC power from a convenient home socket into DC power, or through a charger such as that located by the side of the road. Although batteries have been improved in storage capacity for electric energy over the years, the mounting space for and the weight of the battery places a limit on increases in storage capacity.

Accordingly, a driver of the electric vehicle must stop at a charger for electric charge at quite short intervals, requiring frequent cumbersome charging operations during travel. Particularly, long distance travel on freeways takes a greater amount of time to reach a destination because of the frequent stops for such charging.

In a previous known art, a great number of induction coils are embedded in a road and a power supply cable is laid laterally along the road for supplying electric power to electric vehicles during travel. Unfortunately, this art requires facilities of an extremely large scale and of a great deal of cost.

SUMMARY OF THE INVENTION

In view of the foregoing, it is an object of the invention to provide an electric vehicle permitting the charger to efficiently charge the battery thereof, and negating the need for large-scale facilities and frequent stops for electric charging during travel.

BRIEF DESCRIPTION OF THE DRAWINGS

FIGS. 5A and 5B show the coupling mechanism including the reel-like coupling belt; and FIGS. 6A and 6B show another coupling mechanism including an accordion type coupling belt.

DETAILED DESCRIPTION OF THE PREFERRED EMBODIMENTS

Figure 1:
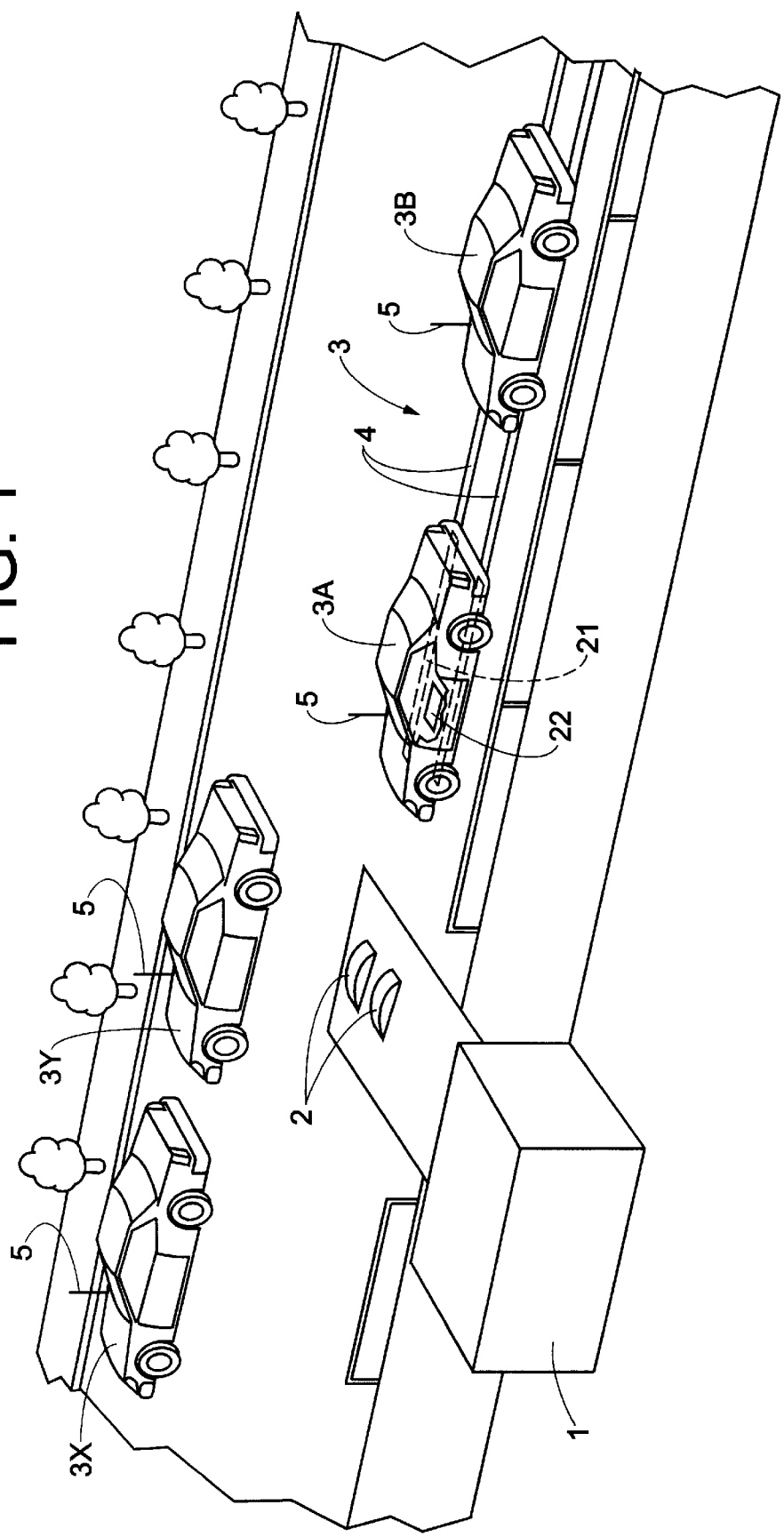
FIG. 1 shows electric vehicles which are subject to a charging operation while traveling.

FIG. 1 shows electric vehicles which are subject to electric charging operations while traveling.

In FIG. 1, a reference numeral 1 denotes an electric charger; 2 a power supply section embedded in a road; 3 a series of electric vehicles which are going to be power supplied; 3A, 3B . . . electric vehicles which are interconnected; 4 a coupling mechanism; 5 a communication element; 21 a power reception section; and 22 a control unit. The charger 1 is located along the road and serves to supply the power supply section 2 with electric energy from an electric power source such as utility power, solar power, battery or the like. The solar power source, in particular, provides the electric vehicles with a less costly electric power energy.

When the first one 3A of the interconnected electric vehicles 3A, 3B . . . passes over the power supply section 2, the power supply section 2 simultaneously charges the battery of not only the electric vehicle 3A but also the second electric vehicle 3B, the third electric vehicle, . . . interconnected via the power reception section 21 of the first electric vehicle 3A. Subsequently, the power supply section 2 performs, in turn, the simultaneous charging of the batteries of the second vehicle 3B and any succeeding vehicles interconnected in series, each time the second vehicle and the succeeding vehicle passes thereover in turn.

If only a single vehicle 3 is driven, the coupling mechanism 4 is held in a bottom of the vehicle body so that the vehicle 3 is used as a conventional electric vehicle. In this case, however, the vehicle can receive only a limited quantity of electric energy from the charger 1.

Even with a small longitudinal length of the power supply section 2 of the charger 1, it is possible to simultaneously transfer the electric energy to all of the interconnected electric vehicles 3 via the coupling mechanisms 4. Moreover, the chargers 1 of a simple configuration located at intervals of a few hundred meters provide for efficient charging of the batteries of the interconnected electric vehicles 3, which are not required to stop frequently for charging purpose during traveling. According to the present invention, electric power energy may be supplied to a driving motor of a vehicle while a battery of the vehicle is being charged.

Each electric vehicle 3 includes the control unit 22 for effecting interconnection with or release from vehicles 3X and 3Y which are driving individually. The control unit 22 utilizes the interconnection of the vehicles for effecting an automatic driving run and an automatic handling run of the vehicles. A description thereof will be given as below.

When, a driver of the vehicle 3Y driving in an unconnected state shown in FIG. 1 desires the automatic driving run, for example, the driver specifies a desired destination through an on-board operation switch (not shown) and then turns ON an automatic drive switch.

Information indicative of this operation is transmitted to other vehicle such as 3Y via the communication elements 5 of vehicles 3X and 3Y.

If the 3X desires interconnection with the vehicle 3Y, the vehicle 3X performs calculations based on the received information indicative of a position and direction of the vehicle 3Y to determine whether the vehicle 3Y can be guided into interconnection therewith or not. Only when determining that the interconnection is possible, the vehicle 3X returns data necessary for the automatic driving run to the vehicle 3Y. For instance, the vehicle 3Y may have an on-board electronic camera for pattern recognition of an interconnection portion of the vehicle 3X in establishing interconnection with the vehicle 3X.

Figure 2:
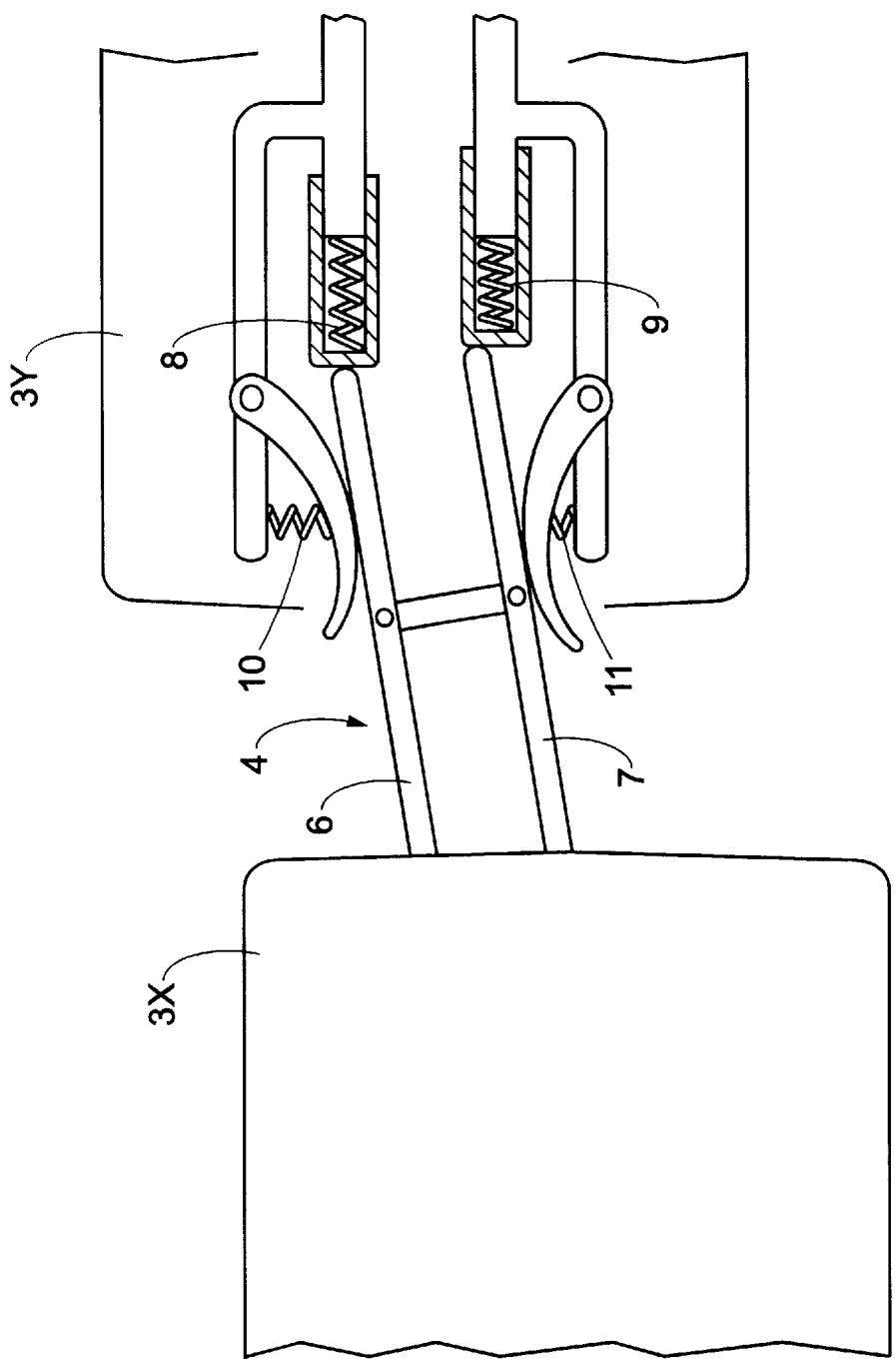
FIG. 2 shows a coupling mechanism of an electric vehicle which is in a state of completion of interconnection.

When the vehicle 3Y approaches to reduce inter-vehicle spacing to a certain degree, the vehicle 3X extends coupling bars 6 and 7 shown in FIG. 2 from the bottom of the vehicle body thereof. At a further reduced spacing therebetween, the coupling operation is considered to be completed so that the vehicle 3Y is automatically driven in a manner to follow the subsequent movement of the vehicle 3X. It is noted that the brake of the vehicle 3Y is manually operable.

On the other hand, releasing operation is performed in response to information indicating that either of the vehicles 3X and 3Y is switched from the automatic driving run to a manual operation run.

When the vehicle 3X outputs information indicative of this switching operation, the succeeding vehicle 3Y is braked to increase the spacing therebetween while the coupling bars 6 and 7 are shortened for completion of the releasing operation.

If the vehicle 3Y outputs information indicative of the switching operation, such information is supplied to the vehicle 3X, which performs the releasing operation in the same way.

FIG. 2 shows the coupling mechanism 4 for interconnection of the vehicles 3x and 3Y.

Referring to FIG. 2, a description is given on the coupling mechanism 4 which not only transfers the electric energy to the respective vehicles 3 but also serves as a sensor permitting the automatic driving run of the vehicle.

The coupling bars 6 and 7 of the preceding vehicle 3X push springs 8 and 9 of the succeeding vehicle 3Y, respectively. Now, assume that L1 and L2 represent respective compression amounts of the springs and that Lmax and Lmin represent a maximum compression amount and a minimum compression amount, respectively, at this time. In principle, the automatic driving run of the succeeding vehicle 3Y is affected by subjecting lateral motors and a steering system of the vehicle 3Y to automatic control based on Lmin<L1 and L2<Lmax. The control unit 22 of the succeeding vehicle performs this control to permit the succeeding vehicle to automatically follow the preceding vehicle 3X.

Specifically, for L1 and L2>Lmax, the vehicle 3Y may be braked. For L1 and L2<Lmin, the vehicle 3Y is considered to be out of interconnection or to become the leading vehicle.

Thus, the coupling mechanism 4 of the simple configuration permits the interconnection of the vehicles and is also utilized for affecting the automatic drive run of the vehicle.

Next, a description is given on control of the automatic handling run. Assume that L3 and L4 represent respective compression amounts of springs 10 and 11 with respect to a direction square to the coupling bar. For L1>Lmin and L3>Lmin, an automatic handling signal instructing to turn right is applied to the control unit 22 of the vehicle 3Y whereas for L2>Lmin and L4>Lmin, an automatic handling signal instructing to turn left is applied to the control unit 22 thereof whereby the automatic handling run of the vehicle is affected. However, abrupt changes of L3 and L4 are considered to be abnormal so that an emergency stop control is performed.

Thus, the coupling mechanism 4 is also utilized for affecting the automatic handling run of the vehicle.

Figure 3:
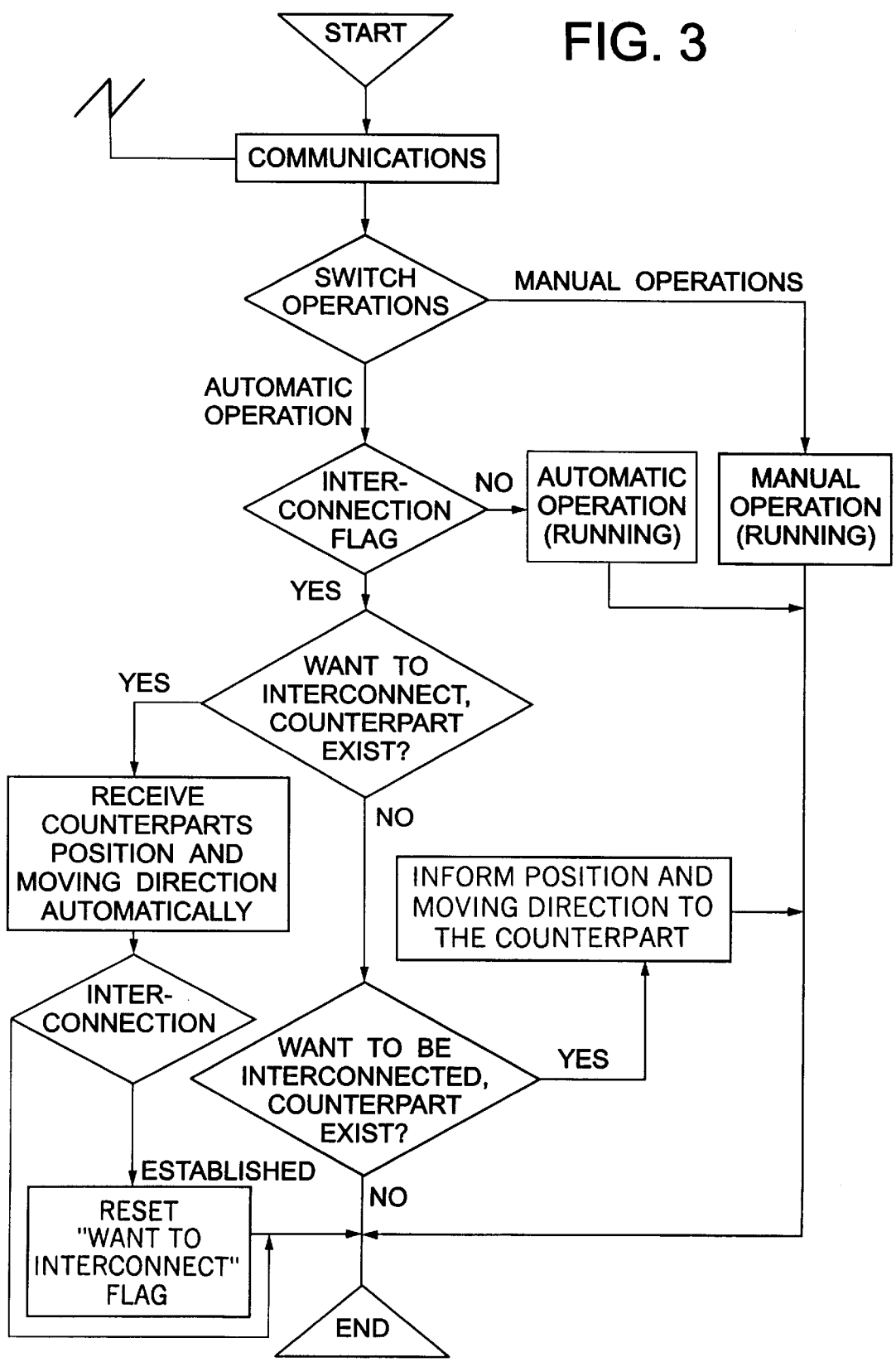
FIG. 3 is a flow chart representing the steps taken when the vehicle is driven under automatic drive control and under automatic handling control.

FIG. 3 is a flow chart representing steps taken in the automatic driving run and in the automatic handling run.

In the foregoing embodiment, the charger 1 supplies the electric energy to the vehicles 3 via contact between the supply section 2 and the power reception section 22 while the coupling mechanism 4 employs a rigid member, such as bar or plate, for transferring the electric energy.

Figure 4:
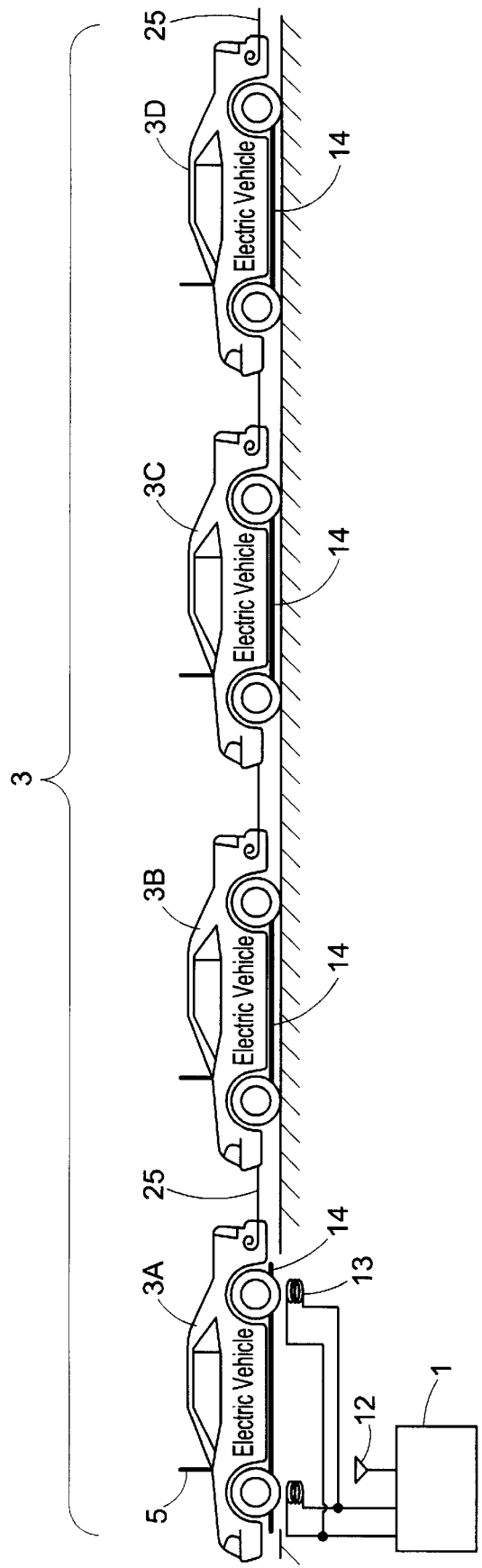
FIG. 4 shows another embodiment of the invention in which electric vehicles are supplied with electric energy in a non-contact manner with a coupling mechanism including a reel-like coupling belt.

FIG. 4 shows electric vehicles 3 according to another embodiment of the invention wherein the electric energy is supplied in a non-contact manner and a coupling mechanism 25 includes a reel-like coupling band for permitting the vehicles to run in interconnection.

Now referring to FIG. 4, the charger 1 includes a battery and an oscillator. The charger has an input connected to a utility power line or a solar panel and an output connected to a high-frequency coil 13.

The high-frequency coil 13 includes forward and rearward coils which are desirably spaced at approximately the inter-vehicle spacing but may be 4 to 5 meters spaced from each other.

Additionally, the high-frequency coil 13 may be embedded in a rubber sheet or a resin sheet. The charger 1 may be disposed at spaced intervals of a few hundred meters.

A coil 14 serves to inductively receive high-frequency electric power from the charger 1 and is longitudinally stretched along a moving direction of the vehicle to cover an entire bottom of the respective electric vehicles 3A, 3B, 3C, 3D . . .

A coupling mechanism 25 is formed of a power line or a flexible copper sheet belt for coupling and reeling at a rear portion of the respective vehicles 3A, 3B, 3C, 3D . . . by a spring force when each vehicle is driving alone. When the vehicles are interconnected, the coupling mechanism is unrolled by the succeeding vehicle so that the vehicles keep driving so as to maintain the spacing therebetween.

Now, a charging operation will be described with reference to FIG. 4.

The interconnection or release of the electric vehicles may be affected by means of the coupling mechanism 4 mentioned above. First, a communication element 12 of the charger 1 communicates with the communication element 5 of the vehicle 3A for sending a control signal such that the vehicle 3A may be driven exactly over the coil 13. When the vehicle further approaches the charger 1, the charger starts supplying electric power to the coil 13.

The high-frequency electric energy is received by the coil 14 of the electric vehicle 3A and then converted into DC voltage (direct voltage) before being transferred to the coupling mechanism 25.

Electric power through the coupling mechanism 25 is used for motor drive and battery storage in the vehicle 3A, and at the same time, for similar purposes of the other vehicles 3B, 3C, 3D . . .

When the vehicle 3A advances further, the coil 14 thereof leaves the left-hand coil 13 of the charger 1 resulting in that the reception of the electric power seems to be suspended. However, at this time the vehicle 3B approaches to the right-hand coil 13 of the charger 1 so that reception of the electric power continues through coil 14 until the last vehicle 3D leaves the charger 1.

Thus is provided a positive, smooth, and non-contact transfer of electric energy to the electric vehicles 3.

FIGS. 5A and 5B show the coupling mechanism 25 comprising a reel-like coupling belt 26. FIG. 5A shows the coupling belt prior to the interconnection of the vehicles whereas FIG. 5B shows the coupling belt after completion of the interconnection. The coupling mechanism 25 will be discussed with reference to FIG. 5.

As shown in FIG. 5A, when a vehicle 3X is driven alone, the coupling belt 26 is wound about a core bar 15 with the force of a spring 16.

A common power line 20 and the coupling belt 26 are electrically interconnected. Although a single set of a core bar 15, a spring 16, a coupling band 26 and a common line 20 is shown in FIG. 5A, there may be provided two sets thereof for respective flows to a positive and a negative terminals. Alternatively, there may be provided a coupling band 26 which is divided into two sections.

When coupling conditions for the two electric vehicles 3X and 3Y are satisfied, the vehicle 3Y slowly approaches the vehicle 3X to receive a contact bar 17 in its receptacles 18 and 19. After the contact bar 17 is held in the receptacles 18 and 19, the vehicle 3Y slows down to increase the inter-vehicle spacing to a predetermined distance, thereby establishing completion of interconnection shown in FIG. 5B.

FIGS. 6A and 6B show another coupling mechanism 27 of an accordion type coupling belt 28. FIG. 6A shows a state prior to the interconnection operation whereas FIG. 6B shows a state after completion of the interconnection. Now, the coupling mechanism 27 will be discussed with reference to FIGS. 6A and 6B. The same contact bar 17 and receptacles 18 and 19 as those of the coupling mechanism 25 shown in FIG. 5 are used.

As shown in FIG. 6A, a coupling belt 28 is accordion-folded within the body of the vehicle 3X which drives alone. To establish the interconnection, the coupling belt 28 is unrolled by the succeeding vehicle to complete the interconnection operation, as shown in FIG. 6B.

Thus, whether the coupling mechanism 26 is comprised of the reel-like coupling belt 25 or the coupling mechanism 27 is comprised of the accordion type coupling belt 28, it is possible to interconnect the electric vehicles 3 with a simple configuration.

As mentioned in the foregoing, the electric vehicles 3 are interconnected while at least the vehicles following may be subject to the automatic driving run. Data communications for the automatic driving run can be carried out by the afore-mentioned coupling mechanisms 4, 25 and 27 as well as between the communication elements 5, 5 between the communication element 12 of the charger 1 and the communication element 5, and between an artificial satellite and the communication element 5 when the automatic driving run is affected.

Besides the automatic supply of electric power, the advantages of the automatic driving run are that a driver can be carried to a remote destination while sleeping, and that the vehicle of an unattended operation can be called up. There are problems to be solved, such as safety verification, the revision of highway traffic laws and the like, before the system of the invention can be applied to highways. Accordingly, the application of the system of the invention may be developed at amusement parks, factory sites, golf courses, tourist destinations and the like.

As a safety measure, a camera and a microphone may be mounted on each electric vehicle 3 such that an image and sound of a vehicle intruding in the course of another vehicle may be recorded to be broadcast to the charger 1 or the public line via the communication element 5 of the latter vehicle.

Next, power distribution to the individual components will be described.

Assuming that the electric vehicle 3 operates on 3.3 kVA, the total power consumption of 20 vehicles interconnected will be 66 kVA. Assuming that the length of a vehicle body plus the inter-vehicle spacing is 6.5 m, then, the overall length of the 20 vehicles interconnected will become 130 m. For example, a charger 1 may be located at every 300 m.

If it is assumed that a vehicle drives at 100 Km/h, a charging time will be 4 seconds and a non-charging time is about 5 seconds during which time period, the vehicles 3 are allowed to drive by inertial energy and energy from the internal batteries). At the lapse of this period, the vehicles reach the next charger 1.

In light of safety considerations and withstand voltages of the electric elements, a voltage to be applied to the electric vehicle 3 is set at 200 V. Current per vehicle is 16.5 A so that the total current of the interconnected vehicles is 330 A (If charging is performed at the same current level, driving current pulse charging current will be 660 A).

Accordingly, the power requirement for the charger 1 is 66×4/(4+5)=29.3 kVA (when 4/9 supplementary power is required) because 66 kVA is consumed in 4 seconds and 0 kVA is consumed in 5 seconds.

Where an unconnected vehicle is driven alone, the power consumption thereof is 1/20 that of the 20 vehicles interconnected. Hence, an equivalent level of electric energy to the interconnected vehicles can theoretically be attained by multiplying 16.5 A by 20 so that there is no need for interconnection to exist. However, an extremely high current results in great losses in wiring, semiconductors and the like, as well as difficultly in battery charging. As a result, the applicability is not provided.

In the embodiment as above described, explanation of the invention has been concentrated on the charging of batteries of electric vehicle. However electric power energy may also be supplied to driving motors of interconnected vehicles. This is effective to drive the vehicle while the battery is being charged. It is noted that the charger 1 need not be installed along the road in a corresponding relation to the supply section 2 and may be installed at drive-inns or parking lots. In addition, the charger 1 may be equipped with a large scale panel. This means that the system of the invention, as a traffic system, not only contributes to reduction in environmental pollution but also economically embodies a vehicle of low fuel consumption in the end.

It is known that the battery on board is reduced in service life due to repeat of full charging and discharging processes. The use of the system of the invention provides for a significant extension of the battery life.

What is claimed is:

1. An electric vehicle comprising:

a power reception section for receiving electric power energy from a power supply section disposed along a road, the electric power supplied by a charger disposed at a predetermined place;

a coupling mechanism for interconnecting electric vehicles and permitting transfer of electric power energy; and a control unit for controlling interconnection of said electric vehicles, wherein said power supply section simultaneously charges batteries of a plurality of electric vehicles to be interconnected via said power reception section of the first one of the electric vehicles when the first electric vehicle passes over said power supply section on the road surface, and then similarly performs, in turn, simultaneous charging of batteries of the second or any succeeding electric vehicles for the rest each time the second and any succeeding vehicle passes over said power supply section on the road surface.

2. An electric vehicle as claimed in claim 1, wherein said coupling mechanism permits at least two divided coupling bars extended from a rear portion of a preceding electric vehicle to be coupled with a front portion of a succeeding electric vehicle by means of a spring, respectively.

3. An electric vehicle as claimed in claim 1, wherein said control unit permits an automatic driving run of the succeeding electric vehicle based on compressed conditions of said plural springs when at least two divided coupling bars extended from the rear portion of the preceding electric vehicle are coupled with the front portion of the succeeding electric vehicle by means of a spring, respectively.

4. An electric vehicle as claimed in claim 1, wherein said coupling mechanism permits at least two divided coupling bars extended from the rear portion of the preceding electric vehicle to be coupled with the front portion of the succeeding electric vehicle by means of a spring coming into contact with a respective lateral side of the coupling bars.

5. An electric vehicle as claimed in claim 1, wherein said control unit permits an automatic handling run of the succeeding electric vehicle based on compressed conditions of said plural springs when at least two divided coupling bars extended from the rear portion of the preceding electric vehicle are coupled with the front portion of the succeeding electric vehicle by means of the springs contacting the lateral sides of the coupling bars.

6. An electric vehicle as claimed in claim 1, wherein said charger supplies the electric vehicle with electric power energy from a solar power or a commercially available power source.

7. An electric vehicle as claimed in claim 1, wherein said power supply section and said power reception section utilize an induction coil for transferring electric power energy from said power supply section to said power reception section.

* * * * *